May 10, 1960 J. O. BEAUMONT ET AL 2,936,207
APPARATUS FOR DISPLAYING TRI-DIMENSIONAL DATA
Filed Oct. 11, 1957 6 Sheets-Sheet 1
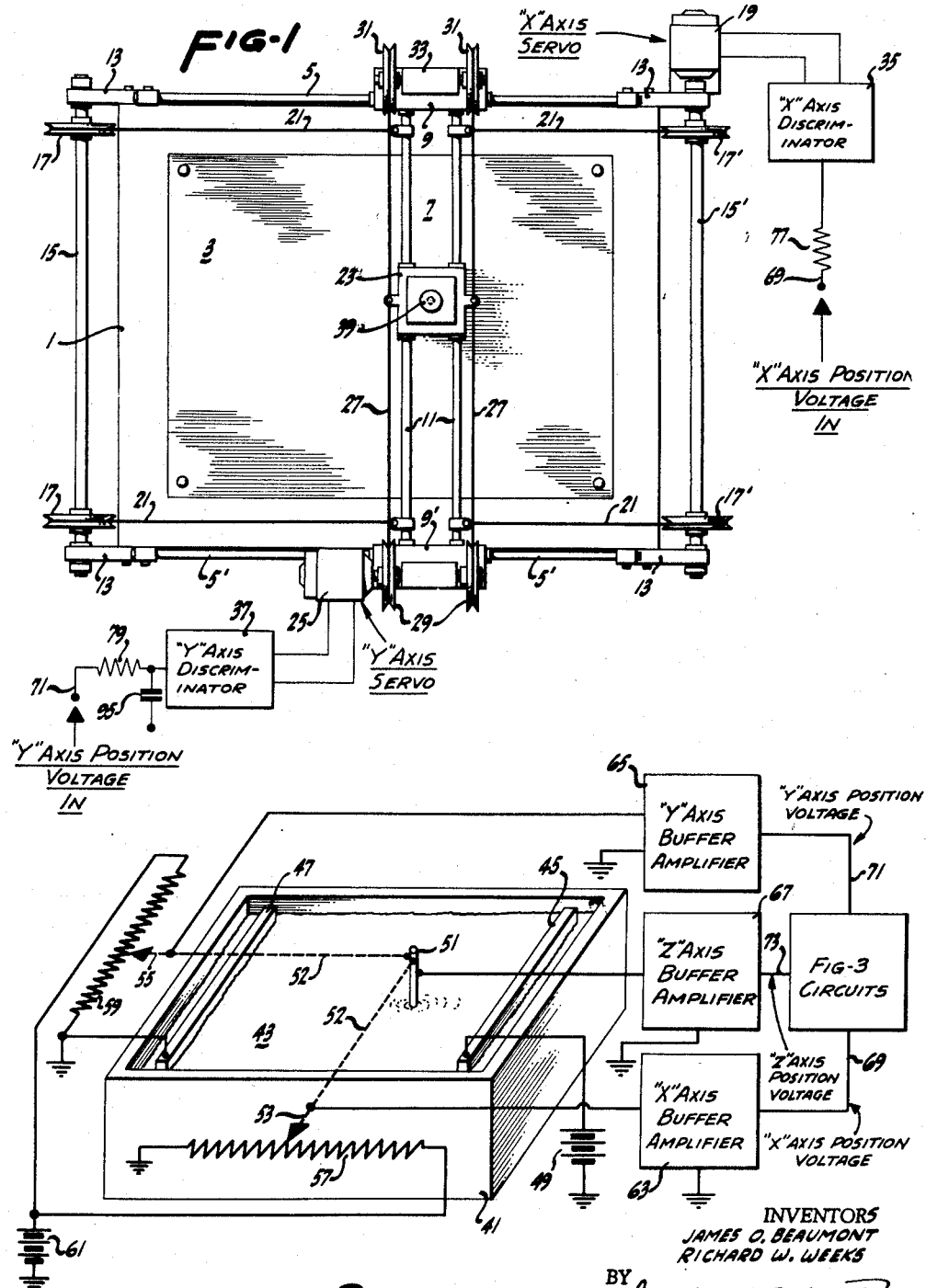
INVENTORS
JAMES O. BEAUMONT
RICHARD W. WEEKS
BY
ATTORNEYS May 10, 1960 J. O. BEAUMONT ET AL 2,936,207
APPARATUS FOR DISPLAYING TRI-DIMENSIONAL DATA
Filed Oct. 11, 1957 6 Sheets-Sheet 2

INVENTORS
JAMES O. BEAUMONT
RICHARD W. WEEKS
BY
Lippincott, Smith & Ralls
ATTORNEYS May 10, 1960 J. O. BEAUMONT ET AL 2,936,207
APPARATUS FOR DISPLAYING TRI-DIMENSIONAL DATA
Filed Oct. 11, 1957 6 Sheets-Sheet 3

INVENTORS
JAMES O. BEAUMONT
RICHARD W. WEEKS
BY
ATTORNEYS

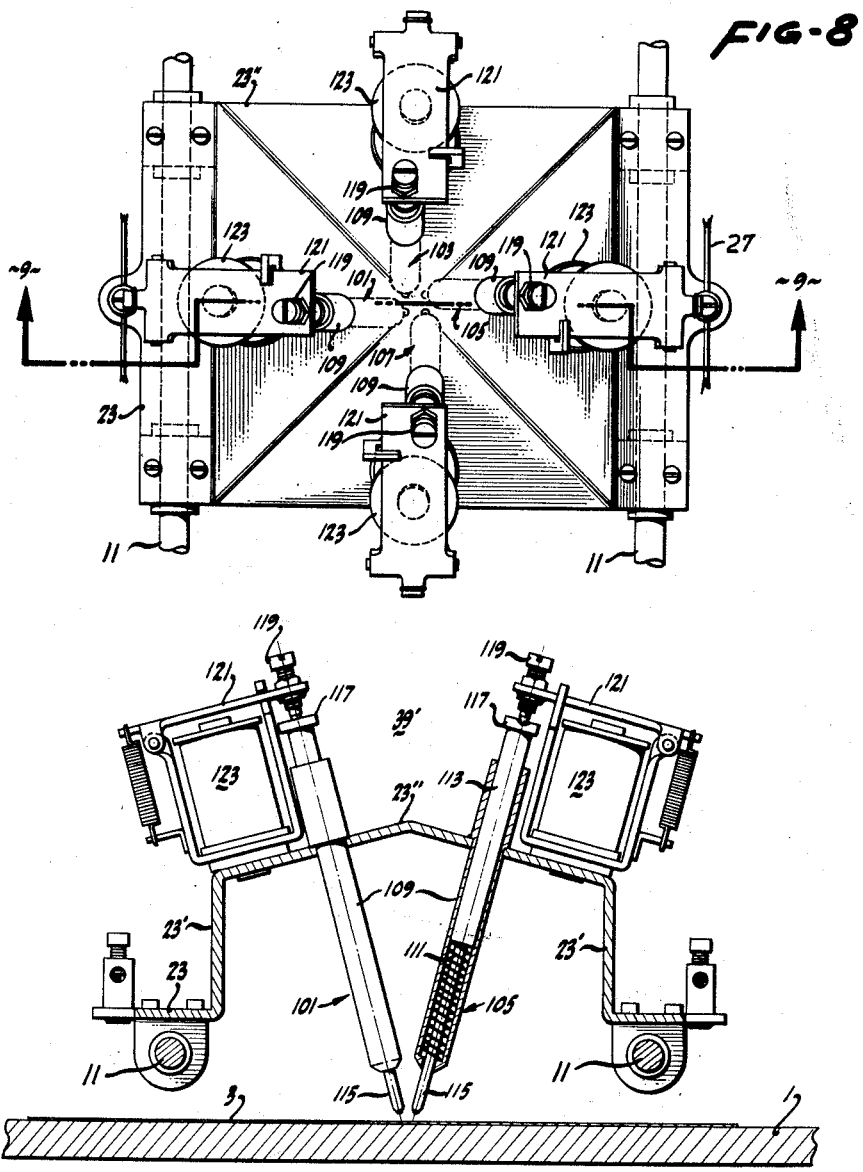

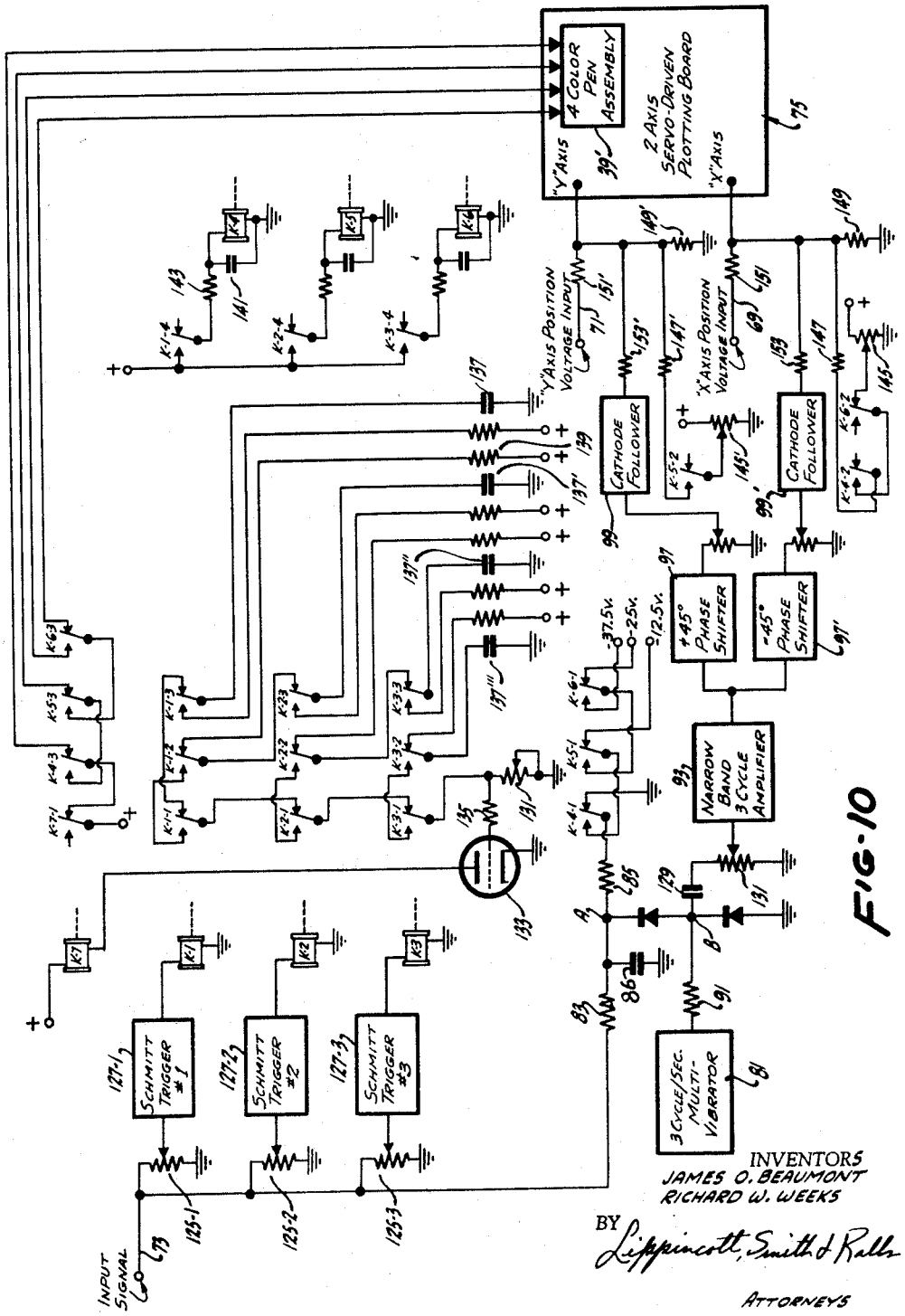

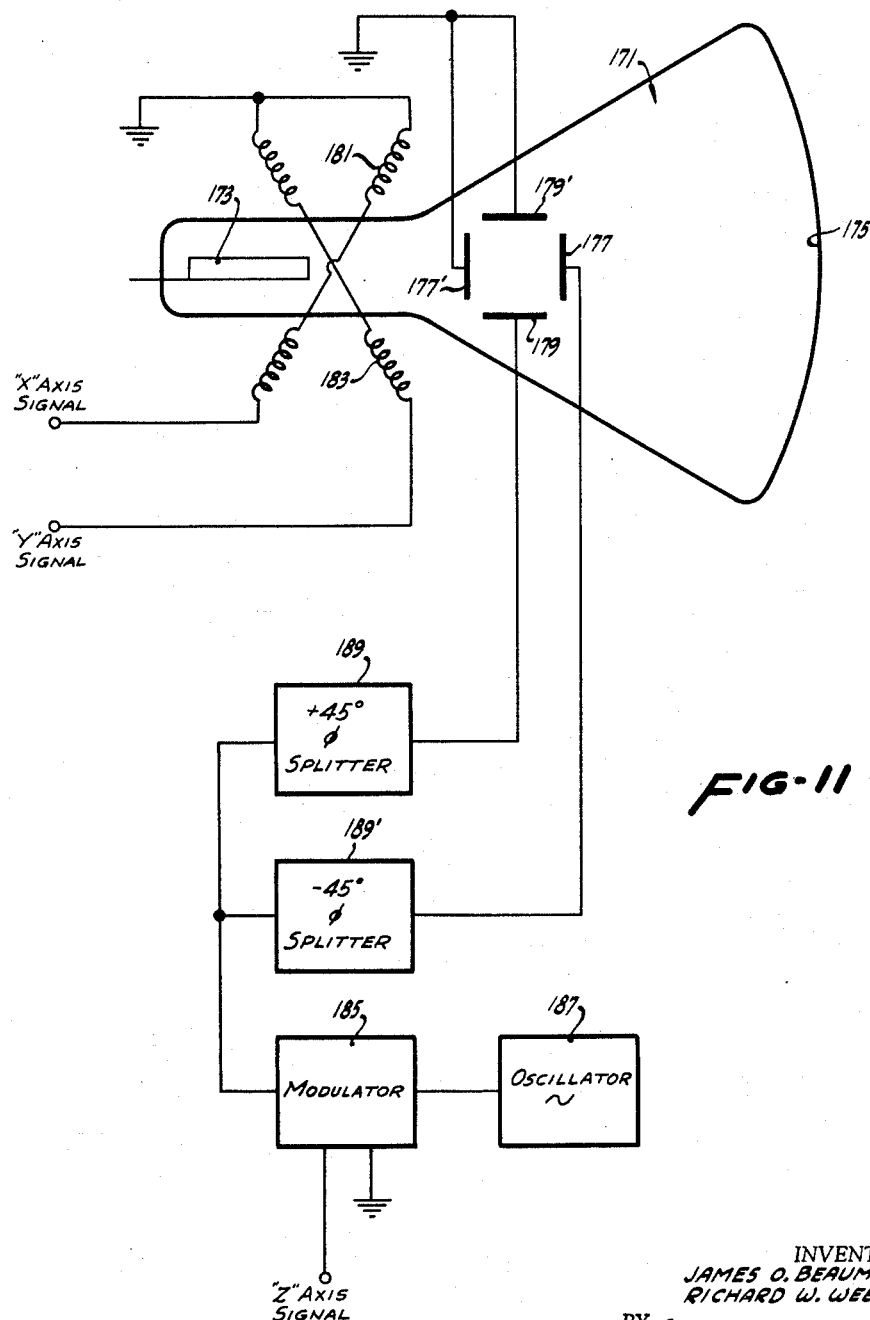

ial potentials may be used to reproduce a visible trace on a display surface, the coordinates of the trace upon the surface and its character indicating, respectively, three dimensions of the data to be plotted. Another object of the invention is to provide a type of apparatus which, in its various embodiments, can produce a display of data which vary quite slowly with respect to time or, alternatively, which vary
United States Patent Office 2,936,207
Patented May 10, 1960

2,936,207

APPARATUS FOR DISPLAYING TRI-DIMENSIONAL DATA

James O. Beaumont and Richard W. Weeks, Los Gatos, Calif., assignors to Vernon J. Pick, Saratoga, Calif.

Application October 11, 1957, Serial No. 689,564

3 Claims. (Cl. 346—29)

This invention relates to a method of displaying tri-dimensional data and apparatus for developing such a display; i.e., apparatus for producing a display showing the inter-relation between three variables. Throughout this specification the word "dimension" is used to mean the magnitude of any one of such inter-dependent variables. The term therefore may be used to designate widely different quantities. The display produced might, for example, indicate the elevation of an airplane together with its coordinates with respect to a mapped area, but it might, equally well, represent simultaneously the base current and collector current of a transistor, plotted with respect to the voltage applied to the transistor base.

The data to be displayed are, in effect, plotted on a two-dimensional surface, two of the dimensions of the data being plotted with relation to two dimensions of the plot, these dimensions being expressed either in Cartesian co-ordinates with the dimensions plotted along the X and Y axes, or in polar coordinates the dimensions whereof are an angle and the length of the radius vector. It is the plotting of the third dimension of the data and the means for applying it with which the present invention is primarily concerned.

The presentation of three-dimensional data on a bi-dimensional surface, whereby the inter-relation of three quantities can be observed as a general, overall pattern, presents a problem for the solution of which a number of types of display have been proposed. Of these, one of the most widely used is that employing contour lines, such as are employed to show relief in topographical maps. This mode of display can be used in presenting any other three-dimensional data besides those of surface coordinates plus height. It does not, however, lend itself to automatic plotting of data that has been translated into electrical voltages or currents and is in any event extremely laborious. Other methods of indicating a third dimension of a two-dimensional plot include the use of hachure lines or color gradations to indicate the third dimension but these also involve difficulties if automatic plotting is to be attempted.

The broad purpose of the present invention is to provide a method of displaying the third-dimentional data in inter-relation to the other two, simultaneously displayed dimensions, together with apparatus which will produce such a display of three-dimensional data automatically. Using known techniques it is possible to translate data, of substantially any character and almost irrespective of what these data represent, into electrical potentials varying in accordance with the magnitude of the quantity to be presented. One of the objects of the present invention is to provide means whereby three such electrical potentials may be used to reproduce a visible trace on a display surface, the coordinates of the trace upon the surface and its character indicating, respectively, three dimensions of the data to be plotted. Another object of the invention is to provide a type of apparatus which, in its various embodiments, can produce a display of data which vary quite slowly with respect to time or, alternatively, which vary with time with extreme rapidity. Another object of the invention, is to provide means whereby the somewhat limited range of third-dimensional variation which the system is normally adapted to present may be extended several fold, so as to give as wide a latitude in this dimension as may be desired.

In accordance with the method of this invention, two dimensions of the data to be presented are represented by position along the X and Y coordinates of the Cartesian system or the $\theta$ and R coordinates of the polar system. The third dimension of the data is represented by the amplitude of an oscillatory trace centered on the corresponding two-dimensional coordinates.

Considered broadly the apparatus of the present invention comprises a display surface and means movable for producing a visible trace on said surface. The display surface may be, for example, the luminescent screen of a cathode-ray tube and the trace-forming means may be an electron gun directing a beam of cathode rays against the screen, or the display surface may be a plotting board, the trace forming means may be a stylus carriage adapted to be moved in two directions across the board. As is usual in plotting equipment, means are provided for moving the trace-forming element bidimensionally across the surface of the screen in response to variations in two of the dimensions of the data to be presented; e.g., the customary deflecting coils or plates if the instrumentality used is a cathode-ray tube, or a pair of servo-motors in the case of the plotting board. In addition to these conventional features the invention comprises means for generating oscillations and means for modulating the oscillations so generated in accordance with the magnitude of the third dimension of the data to be presented, and means are provided for applying the modulated oscillation thus produced for moving the trace-forming means in at least one dimension, thus superposing upon its movement in response to the first two an oscillatory movement, the amplitude whereof corresponds to the magnitude of the third dimension, this amplitude being small in comparison with the maximum movement of the trace-forming means in response to the other two quantities. In certain circumstances it is desirable to apply the modulated oscillations in two dimensions and in quadrature, as a result of which there are traced out circles or loops whose diameter depends upon the magnitude of the third quantity, the radii of the loops being variable between zero and some predetermined maximum.

As will be shown hereinafter, although the display produced is easy to interpret, the size of the circles or oscillations of the trace-forming means that can readily be produced and still present a readily readable chart is somewhat limited, so that the third-dimensional scale may be compressed. In order to expand this scale and make the plot more readily readable the invention comprises means for subdividing the third-dimensional data into a plurality of ranges, so that the size of the circles varies only within certain defined limits, their amplitude increasing from zero to a maximum as the third-dimensional data increases over a first range, then dropping back to zero and increasing to the same maximum amplitude of the second range, etc. Additional means are provided so that at the end of each range a stylus or trace-forming element of different character comes into play; for example, the first range may be represented by circles of one color, increasing from zero to the maximum and then changing color over the second range, the process being repeated as often as seems desirable.

A fuller explanation of several embodiments of the invention follows, illustrated by the accompanying drawings wherein:

Fig. 1 is a highly simplified diagram of a servo-motor driven plotting-board of well-known type, to which the present invention is applicable;

Fig. 2 is a similar diagrammatic drawing of an electrolytic tank wherein, for illustrative purposes, it is assumed that it is desired to obtain the pattern of the electrical potentials developed when current flows between a pair of electrodes submersed therein, two dimensions of the data developed being, in this case, the position of a voltage measuring probe along the X axis and the Y axis of the tank, and the third dimension being the potential, with respect to ground, of the probe;

Fig. 8 is a top plan view of one form of pen holder that can be used to expand the range of third-dimensional data that can be satisfactorily shown;

Fig. 9 is a section taken generally along the line 9—9 of Fig. 8;

Figure 3:
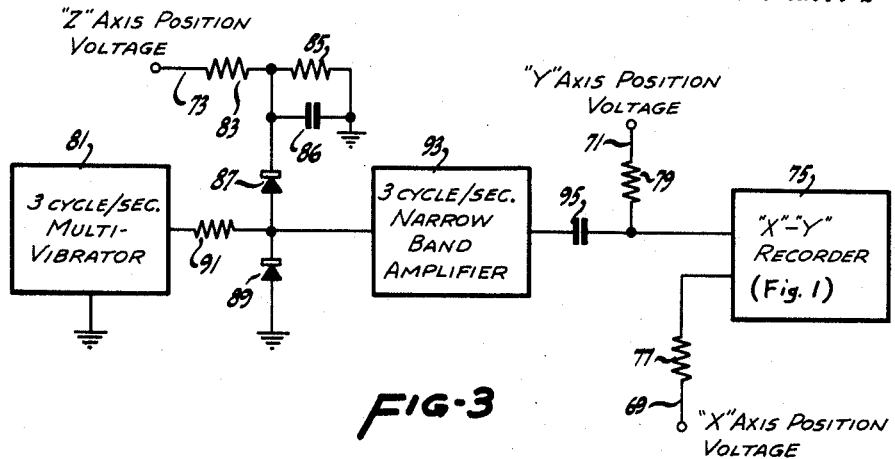
Fig. 3 is a diagram, partly in block form, and partly schematic, illustrating the circuits used to develop the various voltages utilized to trace the desired pattern.

Fig. 10 is a diagram showing circuits that may be employed to operate the apparatus comprising the multicolor arrangement of Figs. 8 and 9; and Fig. 11 is a diagram of a system in accordance with the present invention for recording and displaying data that varies with time more rapidly than can be satisfactorily recorded with the mechanical equipment illustrated in the previous figures and for this purpose using the luminescent screen of a cathode-ray tube as the display surface.

As has already been stated the invention can be applied to any type of equipment that is adapted to plot two-dimensional data supplied to it in the form of electrical signals. Such equipment is available on the open market in various embodiments, both mechanical and electronic, and the class of equipment used depends very largely upon the necessary speed of response, space, and weight, and upon whether a permanent record is necessary or desired.

Fig. 1 is a highly simplified, diagrammatic illustration of an electro-mechanical plotting board, adapted to produce a permanent record of two-dimensional data and since these devices are well known only the most important elements of the structure are shown and these in purely diagrammatic form.

The device comprises a flat plotting-board or table 1, to which, when in use, there is secured a sheet of paper or other material 3 on which the plot is to be drawn. Secured to the upper and lower edges of the board is a pair of rails 5, 5' on which there run a transverse carriage, generally indicated by the reference character 7. The transverse carriage comprises a pair of trucks 9, 9', one running on each rail, between which extend a pair of cross-rails 11.

A pair of brackets 13 extends outwardly from each end of the board 1 and in each pair of brackets there is journalled a shaft 15, 15', extending across the ends of the boards, each of these shafts bearing a pair of pulleys 17, 17'. Shaft 15 is free running; shaft 15' is driven by a servo-motor 19. The cable 21 connects to the carriage 7 adjacent to each end, passes around pulley 17', returns under the board to pulley 17 and thence returns to an attachment on the other side of the carriage.

A stylus-carriage 23 is mounted on the transverse rails 11 and is moved along them by means of a servo-motor 25, mounted on the truck 9' and driving the carriage by means of cables 27 that are attached to each side of the carriage and pass over pulleys 29, mounted on the servo-motor shaft and pass beneath the board and over pulleys 31 on a shaft carried by brackets 33 mounted on the truck 9.

Servo-motor 19 positions the carriage 7 along the X-axis at a point determined by a "position voltage" supplied to the X-axis discriminator 35. Similarly, the Y-axis servo-motor 25 positions the stylus-carriage 23 along the Y-axis at a distance from the rail 5' determined by position-voltage supplied to Y-axis discriminator 37. The stylus-carriage 23 carries a stylus- or pen-mount 39 bearing one or more styli that can contact the paper to trace upon it the course of the stylus carriage. As used herein "stylus" is employed as a general term; the stylus used may, for example, be a pencil, a pen, or a metallic point that contacts chemically treated paper and marks it either upon mere pressure or in response to current flow.

One device of the general character that has been described operates in response to position-voltages varying between zero and +50 v. With zero voltage supplied to the X-axis discriminator the carriage 7 moves to the extreme left of the plotting board, while +50 v. so applied moves the carriage to the extreme right. Similarly, zero Y-axis voltage moves the pen-carriage to the lower edge of the plot while +50 v. moves it to the top. Voltages between these values move the stylus to positions proportional to the respective input voltages. The servo-motors are sensitive enough so that they will respond satisfactorily to frequencies up to about 7 cycles per second for the purposes for which the apparatus has been employed.

In order to illustrate and explain the present invention it will be described in connection with data supplied by apparatus schematically illustrated in Fig. 2, which represents an electrolytic tank 41 containing a liquid 43 in which there are immersed an anode 45 and a cathode 47. The cathode is grounded while the anode is maintained at a positive voltage by D.C. source 49. What is desired is a plot of the voltages at various points across the tank with respect to ground. These voltages are determined by means of a probe 51 which is mechanically connected, as indicated by the dotted lines 52, with movable contacts 53 and 55 of a pair of potentiometers 57 and 59 respectively. It is assumed that the moving contacts of the potentiometers follow the mechanical movement of the probe. The left-hand end of potentiometer 57 and the lower end of potentiometer 59 are grounded while their opposite ends are connected to the positive terminal of a 50 v. source 61.

It will be seen that this arrangement is adapted to supply data signals in three dimensions. Contact 53 connects to an X-axis buffer amplifier 63 which may, for example, be a cathode follower which will deliver an output voltage substantially proportional to that applied to its grid. Such an amplifier has the advantage of a high input impedance so that it draws almost no current and therefore does not sensibly disturb the voltage gradient across potentiometer 57. Potentiometer contact 55 is similarly connected to a Y-axis buffer amplifier 65, and the probe 51 to a Z-axis amplifier 67. The outputs of the three buffer amplifiers connect through leads 69, 71 and 73 respectively of the circuits illustrated in Fig. 3, wherein the last-named three leads are similarly designated.

In Fig. 3, the X—Y recorder of Fig. 1 is generally designated by a single block 75. The X-axis position-voltage is supplied to the recorder from the lead 69 through a resistor 77 that connects to the X-axis discriminator 35 of Fig. 1. Similarly, the Y-axis position-voltage is supplied from lead 71 through a resistor 79, shown in Fig. 1 as connecting to the Y-axis discriminator 37. The remainder of Fig. 3 illustrates apparatus for generating and modulating the Z-axis position-voltage.

A source of oscillation is provided of a frequency low enough to permit effective response by the Y-axis servomotor 25 and in the illustrated case the frequency chosen is 3 cycles per second. The most convenient type of oscillator for developing frequencies as low as this is a multivibrator 81 which develops square wave, relaxation oscillations of this frequency and of an amplitude in excess of the voltages developed between the probe 51 and ground. These latter voltages are supplied through lead 73 to ground through a pair of resistors 83 and 85, each of the order of magnitude of 100,000 ohms. Resistor 85 is bridged by a condenser 86, having a capacity of about one microfarad which, of course, charges to one-half of the voltage supplied through lead 73.

The junction between resistors 83 and 85 connects to ground through two rectifying diodes, 87 and 89, in series, both of these diodes being poled to present very high resistance to the positive voltages from the lead 73. The three-cycle output voltage of the multivibrator 81 is applied to the junction between the diodes through a resistor 91, of high value as compared to the resistors 83 and 85, e.g., about 2.5 megohms. The junction of resistor 91 and the two diodes connects to a three-cycle, narrow-band amplifier 93 the output connection of which goes through a large blocking condenser 95 to the input of the X—Y recorder 75, connecting to the Y-axis discriminator, being effectively added to the Y position-voltage delivered through line 71.

In operation, as long as the oscillating voltage developed by the multivibrator is positive with respect to ground and negative with respect to one-half of the Z axis voltage as it appears at the junction of resistors 83 and 85, the multivibrator locks into the very high input impedance of the amplifier 93 and the drop through resistor 91 is negligible. When the oscillator voltage swings negative the same condition obtains until the voltage drops to ground potential, at which time the resistance of diode 89 becomes negligible in comparison with that of resistor 91 and the voltage at the junction drops to zero. On the positive swing a similar effect is produced; the voltage at the junction of the diodes builds up until it becomes equal to one-half of the Z-axis voltage, at which time diode 87 starts to conduct, the combined resistance of diode 87 and resistor 85 is low in comparison with that of resistor 91 and substantially no increase in voltage at the input of amplifier 93 occurs with increased positive swing of the multivibrator output.

The result is a square-wave oscillation the peak-to-peak amplitude whereof is one-half of the Z-axis voltage as it appears at lead 73. While there is no definite theoretical limit to the value of this voltage which may be used to represent the Z dimension, for practical purposes the amplitude of the oscillation delivered by the amplifier 93 should be relatively small in comparison with the maximum voltage developed at the Y-axis positioning lead. In practice it has been found that, using a positioning voltage varying between zero and 50 v., a maximum peak-to-peak excursion of 6.25 v. in the Z-axis positioning oscillation is satisfactory.

The narrow-band amplifier 93 takes the major higher frequency components out of the oscillation that is superposed on the Y-axis position-voltage, converting the sqare wave output of the multivibrator into a substantially sine-wave oscillation. With the type of equipment here shown the filtration is not strictly necessary, since the servomotors would, of themselves, act as mechanical filters and, as far as the movement of the carriage is concerned, have much the same effect. Prefiltration, however, reduces the losses and minimizes stresses on the motors.

Figure 4:
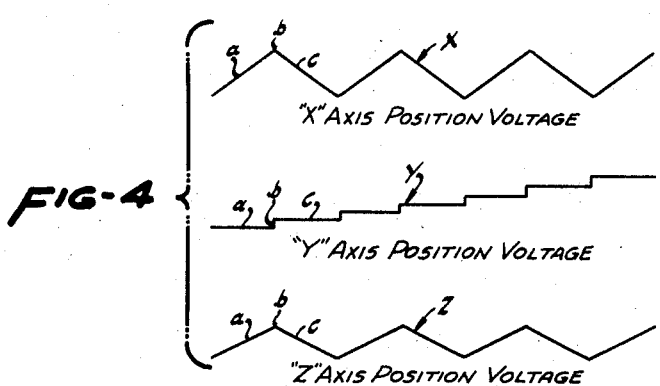
Fig. 4 is a series of graphs indicating the voltages developed by the apparatus of Fig. 2 in accordance with one possible scanning pattern.
Figure 5:
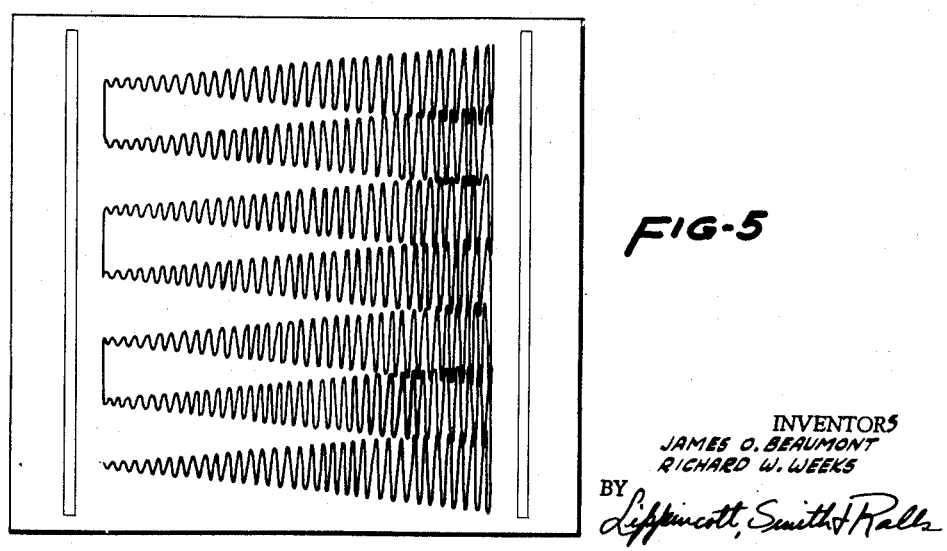
Fig. 5 illustrates the form of plot produced by the apparatus of Figs. 1, 2 and 3 in accordance with the scanning pattern producing the waveforms of Fig. 4.

The operation of the apparatus and the general overall appearance of a plot produced by it are illustrated in Figs. 4 and 5. It is assumed that the entire area of the tank 41 is to be scanned. The probe 51 is started at the lower left-hand corner of the tank and moved parallel to the X-axis until nearly in contact with the anode 45. This develops a voltage at the potentiometer contact 53 that rises from zero to substantially 50 v., as indicated by the portion a of curve X of Fig. 4. This first movement of the probe produces substantially zero voltage in the Y circuit; the probe voltage, in the simple case considered, rises linearly with X-circuit voltage, both as indicated in the portions of curves Y and Z of Fig. 4 designated as a. The probe is then moved in the Y direction for a short distance, producing a sharp rise in the Y voltage as indicated at b of the curve Y, after which the probe is moved back to the left side of the tank along a line parallel to the X-axis to produce the voltages following the paths indicated at c of each of the several curves. The operation is repeated, thus producing the sawtooth patterns indicated by curves X and Z and the stepped curve of curve Y, until the entire area of the tank has been scanned.

The general appearance of a chart produced in this manner is indicated on a somewhat exaggerated scale in Fig. 5. Each traversal of the tank parallel to the X-axis produces a trace across the paper in the form of a sine wave of varying amplitude, centered on the lines corresponding to the path of the probe, the amplitude of the sinusoidal trace being directly proportional to the Z dimension of the data supplied.

This particular form of trace is particularly useful in applications where the desired plot fills an entire chart and where a scanning operation along lines substantially parallel to the X-axis is convenient. One such use of the invention is in connection with geophysical surveys that can be conducted by repeatedly flying an airplane across the area to be mapped in scanning fashion, as, for example, in surveying an area with an airborne magnetometer. Apparatus is available for reducing the position of the plane with respect to the area to be surveyed into voltages proportional to the X and Y coordinates of the map and through other apparatus, also commercially available, the magnetometer output also can be presented in the form of a direct voltage. With a scanning pattern of this type a simple sinusoidal modulation of the X position voltage alone gives a form of graph which is perhaps the easiest read of any that can be produced through the use of the invention.

There are many applications of the invention, however, where this is not the case. It will be seen that with movement of the probe of Fig. 2 along a line parallel to the Y-axis the amplitude of any modulation applied to the Y circuit alone would be unreadable and the results indeterminate. The apparent width of the band formed by any diagonal trace would vary with the slope of the line followed by the probe.

Figure 6:
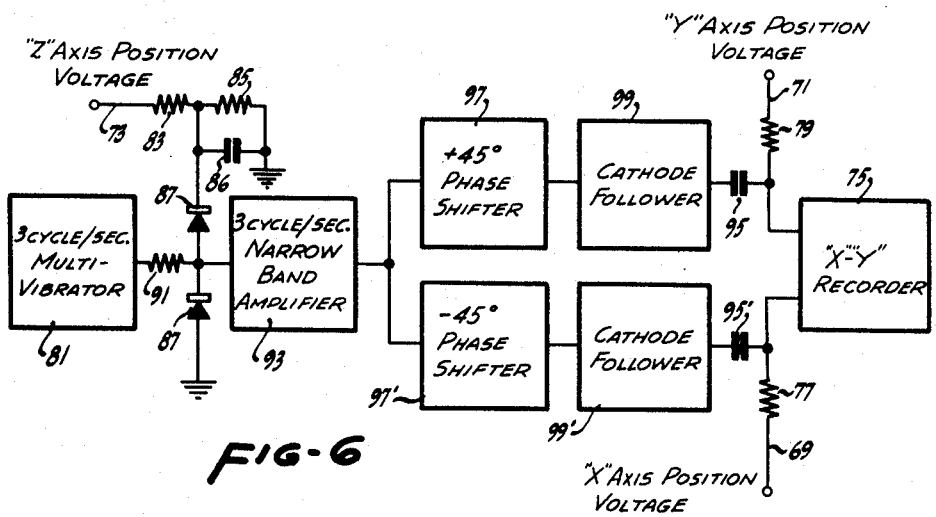
Fig. 6 is a diagram, largely in block form, indicating the method of introducing oscillations indicative of the third dimension of the data into both X and Y axis deflections.
Figure 7:
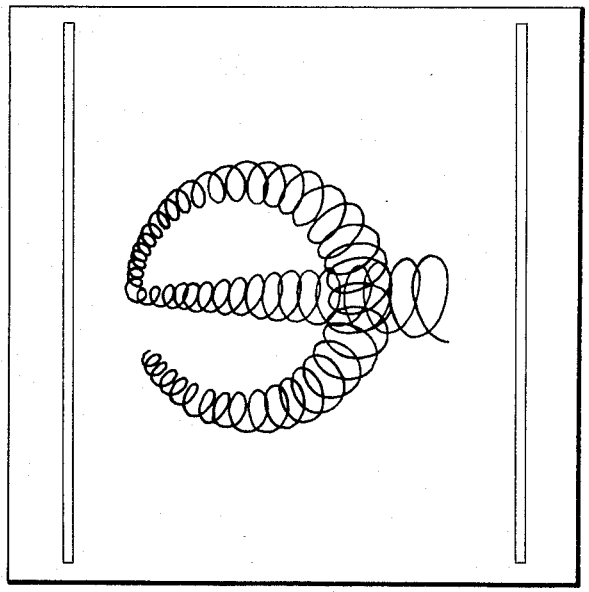
Fig. 7 is illustrative of the form of plot developed by the apparatus when excited by the circuits of Fig. 6.

The difficulty is readily avoidable by introducing the Z-axis oscillations in quadrature into both the X and Y circuits as is indicated in Fig. 6. The means used for generating the three-cycle oscillation, modulating it, and filtering out the higher frequency components are the same as those shown in Fig. 3 and the elements are therefore indicated by the same reference characters as in the latter figure. Instead of feeding directly into the X—Y recorder, however, the narrow band amplifier 93 supplies two phase shifters, one of which, phase shifter 97, advances the phase of the signal by 45 degrees, while the other, phase shifter 97', retards the phase by a like amount. The phase shifter output in each case feeds a cathode-follower buffer amplifier 99, 99', which in turn connect to the Y and X circuits through blocking condensers 95 and 95' as before. As a result of this arrangement the stylus will trace circles whose diameters are proportional to the Z dimension of the data as long as the probe 51 remains stationary; this circular oscillatory motion is superposed on the X and Y motions when the probe is moved, resulting in a generally cycloidal path. The trace resulting from moving the probe 51 in a nearly complete circular path and then across the diameter of the circle parallel to the X-axis is illustrated in Fig. 7. It will be seen that with this arrangement the width of the envelope of the trace remains constant irrespective of the direction of the movement of the probe, which has a very great advantage when the X and Y dimensions of the data vary in a random or unpredictable manner. One example of this would be where the X and Y-axes indicated the position of an airplane while the Z-axis data represented the elevation of the plane above the surface of the ground.

The somewhat limited range of values that can be satisfactorily depicted by the invention as thus far described can be increased by dividing the total range into a plurality of sections, and assigning to each section a different color trace. Thus, for example, if the total range of voltages representative of the Z dimension is from zero to 50, the entire range may be divided into four sub-ranges, each of 12.5 v. Within these sub-ranges variations in the Z dimension data vary the amplitude of the trace between zero and a maximum. Thus, for example, the range between 0 and 12.5 v. can be traced in yellow; when the value representative of the dimension Z reaches 12.5 v. the amplitude of the oscillation drops back to zero but the color of the trace is changed to green, its amplitude increasing again to a maximum at a value of 25.0 v. and the color of the trace changing to blue. Finally, at a value of 37.5 v. the process is repeated with the color of the trace being changed to red. The choice of color is, of course, completely arbitrary, the example given, however, is one that has been used in practice.

One means of accomplishing this is illustrated in Figs. 8, 9 and 10, Figs. 8 and 9 illustrating plan and section views of a stylus holder adapted to change the colors of the trace to give the desired result while Fig. 10 illustrates circuits by which the change is accomplished.

With the apparatus shown in Figs. 8 and 9 the styli used are essentially ball-point pens carrying four different colored inks. In the apparatus diagrammatically illustrated in Fig. 1 it replaces the single stylus holder 39 and is therefore designated, generally, as 39'.

In the form here illustrated the stylus-carriage 23 is conveniently formed with vertical walls 23' enclosing two sides of a square surmounted by an obtusely pyramidal cap 23".

Four retractable-point ball-point pens, generally identified by the reference characters 101, 103, 105 and 107, project downward through the cap 23" at angles such that their points, when extended, contact the surface of the paper on the plotting board at as nearly as possible the same spot. Each of the pens comprises an outer metal tube 109 which is soldered or otherwise secured to the cap 23". The lower end of this tube is inwardly flanged to provide an abutment for a compression spring 111 that surrounds an inner ink-tube 113, bearing, at its lower end, a fitting 115 that carries the usual ball point.

The ink-tubes used can be the usual "refills" that are commercially available for pocket pens. Fitted into the upper end of each ink-tube is flanged button 117 that is notched at one edge to provide a vent permitting the ink carried by the tube to feed. The button acts as an anvil against which bears an adjusting screw 119, carried by one end of the armature 121 of a clapper magnet 123 of a conventional type. It will be seen that when any one of these magnets is excited it extends the ball-point fitting 115 at the end of the ink tube into contact with the paper so as to produce a trace in the particular color of ink carried by the pen point extended.

Circuits adapted to actuate the apparatus to give four color ranges in response to Z-dimension voltages ranging from zero to +50 v. are illustrated in Fig. 10. The Z-axis voltages are supplied over the lead 73 to a circuit having four branches. Three of these branches are identical except for adjustment, each comprising a high-resistance potentiometer connecting to ground, these potentiometers being designated in the drawing as 125–1, 125–2 and 125–3 respectively. The movable contacts of these pontentiometers connect to Schmitt trigger circuits 127–1 to 127–3 respectively. The Schmitt trigger is a well-known circuit, which will fire to supply current to its output circuit when the input voltage exceeds a definite, preset value and cut off when the input drops below this value. The respective Schmitt triggers supply actuating current to relays, designated, respectively, as K–1, K–2 and K–3. By means of the potentiometer 125–1, trigger 127–1 is set to fire when the input voltage from line 73 reaches 12.5 v. tripping relay K–1. Similarly, trigger 125–2 is set to fire at an input of 25 v. and trigger 127–3 to fire and trip relay K–3 at an input voltage of 37.5 v. Thus at input voltages below 12.5 v. none of the relays K–1 to K–3 are tripped, these relays tripping in succession as the voltage rises until, above 37.5 v. all three have been tripped.

The fourth branch of the circuit from lead 73 connects to the equipment for developing a three-cycle oscillation and modulating it with the Z-dimension data voltage. Except as will be specifically described hereinafter, this equipment is identical with that illustrated in Fig. 6, and the elements are therefore designated by the same reference characters. The principal difference in the arrangement of Fig. 6 and that shown in the Fig. 10 is that in the latter resistor 85, instead of connecting directly to ground, connects through a cascaded arrangement of relay contacts which are actuated in a manner, later to be described, so that it connects to ground directly only when none of the relays K–1 to K–3 is tripped. As these relays trip in succession resistor 85 is connected successively to voltages of —12.5 v., —25 v. and —37.5 v. These voltages are supplied by a suitable D.C. source, not shown, as its illustration would complicate the drawing unnecessarily. The same is true of the sources for the actuation of the various cascaded relays, later to be described.

Point A, the junction between resistors 83 and 85, therefore assumes a potential midway between the voltage supplied from lead 73 and that applied to resistor 85 through the relay contacts and hence varies between zero and 6.25 v. as the input voltage varies between zero and 12.5, returns to zero at the 12.5 point input voltage and again rises to +6.25 v. as the input voltage rises to +25 and repeats the same variation over the input ranges of 25 to 37.5 and from the 37.5 to +50 v. The potential at point B therefore oscillates between zero and the potential of point A at the three-cycle per second rate. This voltage is applied through a blocking condenser 129 to a potentiometer 131, by means of which the voltage supplied to narrow band amplifier 93 can be accurately adjusted and fed through the 45 degree phase shifters 97 and 97' to produce the desired quadrature oscillations used to depict the third dimensional or Z-axis data.

Theoretically the relays K–1 to K–3 could be provided with contacts which would perform all of the necessary switching operations to plot the data and switch the color in which it is displayed. Because, however, in a practical device switching can induce transients in the plotting circuits which would interfere with the interpretation of the data and because there may arise mechanical difficulties which prevent the pens from contacting the paper at exactly the same point when actuated, it is preferable to operate the pens indirectly and to provide means for compensating for mechanical imperfections. This is accomplished by a relay bank next to be described. In order to simplify the diagram the various sets of relay contacts are not shown immediately contiguous to the relays that operate them but are designated by the latter and number assigned to the relay, followed by a further postscript number designating the specific set of contacts on the relay. Thus the designation K–1–1 designates the first set of contacts of relay K–1, K–1–2 designates the second set of contacts on the same relay, etc.

The momentary inactivation of the pen magnets at the instant of the switching operation is accomplished through the first three sets of contacts on relays K–1 through K–3. All of the relay contacts are shown in their "normal" position, before any of the Schmitt triggers is fired. In this position it will be seen that the movable contact on relay K–1–1 connects, through the first group of contacts on K–2 and K–3, to ground, through a variable resistor 131 having a maximum resistance of approximately 250,000 ohms (250K). The ungrounded side of this resistor connects to the grid of a triode 133 through a damping resistor 135, so that any voltage drop developed across resistor 131 is applied to the grid of this tube. Before trigger 127–1 fires the movable contact of K–1–1 connects through the right-hand contact of the same group and of K–1–3 to a condenser 137. A second condenser, 137′, connects through contacts K–2–3 and K–1–2 to a source of positive charging-potential through a charging resistor 139. Condenser 137′ therefore is fully charged while condenser 137 is discharged. Operation of the trigger 127–1 actuates relay K–1, connecting its movable contact through the left-hand contacts of K–1–1 and K–1–2 and the closed contacts of K–2–3 to the charged condenser 137′, causing a pulse of current through resistor 131 to put a positive voltage pulse on the grid of tube 133. The plate of this tube connects through the windings of a relay K–7 to a source of plate current. The resulting pulse actuates relay K–7 momentarily, opening the normally-closed contacts K–7–1, through which the various pen magnets are supplied, as will be described hereinafter.

A similar operation, causing a current pulse to flow through relay K–7, occurs when any one of the three relays K–1 to K–3 operates, as will be seen by tracing out the various circuits. It appears unnecessary to describe these circuits in detail, it being sufficient to remark that one of the condensers 137, 137′, 137″ or 137‴ is always charged through one of the corresponding charging resistors in every position of the various relays and is ready to discharge when any one of them either opens or closes to cause a momentary disconnection of the pen-actuating magnets.

Returning to the contacts of relay K–1, an additional set of contacts on the same relay K–1–4 closes to actuate a relay K–4. The winding of this relay is bridged by a one microfarad condenser 141 and a resistor 143 is interposed in series between the windings and the source so that its operation is slightly delayed and the various circuits controlled by it are not switched until relay K–7 has opened the pen circuit contacts and reclosed. A relay K–5 is actuated by an additional set of contacts K–2–4 on relay K–2, and a similar relay K–6 is actuated by contacts K–3–4 on relay K–3. Relays K–5 and K–6 perform functions similar to those of relay K–4, and therefore their circuits need not be traced in detail, being referred to hereinafter only as they differ from those of relay K–4.

Prior to the actuation of any of the Schmitt triggers, a circuit to one of the pen magnets, say that operating the yellow pen, can be traced from the source through contact K–7–1 and the right-hand contacts K–4–3 to the corresponding pen magnet of the pen carriage 39′. After relay K–1 has operated K–4, contact K–7–1 having reclosed, the circuit is traced through K–7–1, the left-hand contact of K–4–3 and the right-hand contacts of K–5–3, to, say, the green pen magnet. Similarly, and without tracing out the circuits in detail, successive operation of the three Schmitt triggers actuate, successively, the blue and red pens.

Reverting now to the modulator circuit in the lower portion of the figure, the operation of relays K–1 and K–4 switches the resistor 85 from its connection to ground through contacts K–4–1 to the left-hand contact of this group and, through the right-hand contacts K–5–1 to the −12.5 v. source. Similarly, when relays K–5 and K–6 operate, successively, to the −25 v. and −37.5 v. sources to bring the amplitude of oscillation of the pen back to zero when the Z-dimension input data voltage reaches corresponding positive values.

Noting the structure of the pen mount it will be seen that the four pens are arranged in pairs, alined along the X and Y axes of the board respectively. Mechanically it is difficult to make them contact the paper on the plotting board at exactly the same point; actuating them in succession, without intervening movement of the carriage, they tend to form a small square. Considering the point of contact through the yellow pen, actuated when none of the Schmitt triggers is fired, as the norm, in order to bring them into register the pen-carriage must be shifted slightly along the X-axis for one pen, along the Y-axis for another and along both X and Y axes for the third. This is accomplished by adding a small constant voltage to the input of the servomotors actuating the carriage along the respective axes. According to the convention here adopted, the yellow pen represents the low range, the green the second, blue the third, and red the highest range. The pens are mounted in this order clockwise around the corners of the square, starting with yellow at the lower-right-hand corner. An X-axis offset is therefore required for the second and third ranges and a Y-axis offset for the third and fourth ranges.

The voltage effecting the X-axis offset is derived from a potentiometer 145 (shown at the lower right of the figure) and is applied to the X-axis circuit through relay contacts K–4–2 and K–6–2. In the normal position of the relays, when none of the triggers has operated, the circuit from this potentiometer is open at contacts K–4–2. When relay K–4 operates it connects the correction source to the X-axis circuit through a series resistor 147 which forms a part of an adding circuit including a common resistor 149, across which the added signals are developed, the other circuits feeding into the X-axis adding circuit being the X-axis signal, fed through resistor 151 from the lead 69 and the oscillating Z-axis signal, fed through series resistor 153 from the cathode-follower 99′. There are no contacts in the X circuit operated by relay K–2 or K–5, and therefore the operation of trigger 127–2 to shift from the second to the third range has no effect on the X-axis offset correction. Operation of the trigger 127–3, however, actuating relay K–6 opens contacts K–6–2 so that the pen carriage reverts to its normal position along the X-axis.

The Y-axis correction-voltage is derived in the same general fashion as the X-axis correction, by taking off a portion of the drop across a potentiometer 145′. The moving contact of this potentiometer connects to contact K–5–2 so that the correction circuit is normally open, but closes when relay K–5 is operated. The drop is applied through series resistor 147′, where it is added to that across resistor 149′ to the Y-axis voltage supplied through resistor 151′ in lead 71 and that through resistor 153′ carrying the Z-axis oscillations. The sum voltages from the adding circuits are supplied to the X and Y servo-motors as has already been described.

It should be readily apparent that there is no necessity that the Z-axis oscillating voltage be applied to the servomotors. Separate means for oscillating the styli can be mounted on the stylus-carriage itself, quite independently of the normal X or Y drives, and for some purposes this could be advantageous, since it is only the stylus that must be vibrated, the frequency response can be made much higher than is possible when the oscillations must be applied through the servo-motors. For example, a spring-suspended stylus may be vibrated by means of a moving coil mechanism such as is used to drive a loud speaker and the rate of oscillation can be made anything up to several hundred or even thousand oscillations per second, instead of the three per second that has been described. The arrangement here shown, however, has the advantage that standard X—Y plotting equipment can be operated in accordance with the present invention without change.

Entirely different apparatus for employing the method of presentation of the invention is illustrated in Fig. 11. The equipment shown can be used, for example, to display the information developed by self-tracking radar equipment arranged to develop X, Y, and Z signals in accordance with the orientation and elevation angle of its antenna, and the target range, with appropriate computing equipment to convert from spherical to Cartesian coordinates. The particular equipment shown comprises a cathode-ray tube, generally identified by the reference number 171, which includes an electron gun 173 for developing a beam of electrons directed against a fluorescent screen 175. The tube in this case includes horizontal or X-axis deflecting plates 177 and 177' and vertical or Y-axis deflecting plates 179 and 179', plates 177' and 179' being grounded. The tube is also provided with horizontal deflecting coils 181 and vertical deflecting coils 183. Such an arrangement would also normally include circuitry for applying beam centering voltages, so that when no deflecting voltages were present the beam would impinge on the center of the screen.

With apparatus of this character the X-axis positioning signals would take the form of currents supplied to coils 181 and the Y-axis signal to currents supplied to coils 183. The Z-axis signals are supplied to an amplitude modulator 185, which modulates them upon oscillations developed by an oscillator 187, whose frequency may, in this case, be as high as may be desired, perhaps, in practice, several thousand cycles per second. Oscillations from the modulator are fed, as before, to phase splitters 189 and 189', the signals from the former being applied to a vertical deflection plate 179 while those from the phase splitter 189' are applied to deflecting plate 177.

It will be seen that as a result of this arrangement the beam will be spun by the quadrature voltages applied across the two sets of deflecting plates in a circle centered upon the coordinates of an airplane being tracked by the radar and of a diameter dependent upon the elevation of the plane.

Numerous modifications of the arrangement shown in Fig. 11 will at once suggest themselves. Either set of deflecting means can be eliminated, and the Z-axis signals added to those in the X and Y deflecting circuits by arrangements generally similar to those that have been shown in connection with the mechanical means for developing the display.

Another rather obvious modification is to employ the method in connection with a plan position indicator which sweeps a field of exploration in accordance with a fixed pattern expressed in polar coordinates. In this case, the X, Y and Z axes signals are constantly developed from the orientation and elevation angles of a scanning antenna, the $\theta$ and R dimensions being resolved into Cartesian coordinates in accordance with well known techniques. In addition to these scanning potentials, however, an additional modulation is imposed upon the beam, cutting it off except when an echo is received. The presence of such an echo develops on the screen a circle whose diameter is dependent upon the position of scanning antenna at the instant the echo is received, and whose position on the screen is determined by the azimuth of the antenna and the distance of the reflecting object. This latter type of display would, of course, usually require the use of a persistent type of screen.

It should be evident to those skilled in the art that the applications of the invention that have been touched upon in this specification are only a few of those that are possible. In certain instances the invention makes possible the presentation of more than three dimensions of data; for example, instead of imposing the same Z-axis signal in both the X and Y dimensions of the plot an oscillation of one amplitude can be imposed upon the X axis to represent, say, the Z dimension, and a second oscillation of different amplitude can be superimposed upon the Y axis to represent a "Z'" dimension. This latter arrangement is particularly applicable where amplitude modulation of the brightness of a cathode-ray trace is employed. Further, an additional dimension of display can be added by using conventional means; in geophysical surveys, for example, the trace can be made upon a contour map or on a transparent over-lay for such a map.

The examples given are therefore not to be considered as limitations but as purely illustrative, all intended limitations being specifically set forth in the following claims.

We claim:

1. Apparatus for use in combination with a recorder adapted to move a stylus-carriage in two dimensions over a display surface to coordinate positions corresponding to the magnitude of two electrical signals applied thereto, to display data representative of the magnitude of a third signal varying over a range between zero and a maximum A, comprising a plurality $n$ of styli each mounted on said carriage and individually extensible to contact said display surface at substantially the same point and each normally retracted out of contact with said display surface and each adapted to produce a different characteristic trace on said surface, individual electromagnetic means for extending each of said styli into contact with said display surface, a plurality of $n-1$ trigger circuits connected for actuation by said third signal at magnitudes thereof of $A/n$, $2A/n$ ... $(n-1)$ $A/n$, a plurality of relays actuated respectively by said trigger circuits contacts on said relays connecting to said stylus-extending means so as to actuate each one thereof over a different range of magnitude of said third signal of $A/n$, means for deriving a plurality of reference signals of magnitudes respectively of $-A/n$, $$-2A/n \ldots \frac{-(n-1)A}{n}$$

connections to contacts on said relays operative to combine said reference signals successively with said third signal upon successive actuation of said trigger circuits to produce a stylus-actuating signal varying in magnitude repeatedly $n$ times over a range proportional to the range $0-A/n$ as said third signal varies over the range $0-A$, means for developing an electrical oscillation, means for modulating said oscillation with said stylus-actuating signal and means for applying said oscillation so modulated to produce an oscillatory motion of said styli.

2. Apparatus as defined in claim 1 including, in addition, means for developing a correction voltage adjustable in magnitude, circuit connections for adding said correction voltage to one of said first-mentioned signals, and additional contacts on said relays for connecting said adding means to apply said correction voltage to compensate for discrepancies in the point of contact of the stylus extended by operation of said relays as compared to the point of contact of the stylus so extended when none of said triggers is actuated.

3. Apparatus as defined in claim 1 including additional relay means for momentarily retracting all of said styli upon each operation of any of said relays.

References Cited in the file of this patent
UNITED STATES PATENTS

| | | |
|---|---|---|
| 2,324,451 | Wait | July 27, 1943 |
| 2,447,018 | Keinath | Aug. 17, 1948 |
| 2,637,619 | Stein | May 5, 1953 |
| 2,651,400 | Young et al. | Sept. 8, 1953 |
| 2,749,205 | Schmitt | June 5, 1956 |
| 2,761,753 | Iatesta | Sept. 4, 1956 |
| 2,775,503 | Peterson | Dec. 25, 1956 |
| 2,778,711 | Fielden | Jan. 22, 1957 |
| 2,839,351 | Cutler | June 17, 1958 |